(12) United States Patent
Wiemker et al.

(10) Patent No.: US 10,074,207 B2
(45) Date of Patent: Sep. 11, 2018

(54) VISUALIZATION OF TISSUE OF INTEREST IN CONTRAST-ENHANCED IMAGE DATA

(71) Applicant: KONINKLIJKE PHILIPS N.V., Eindhoven (NL)

(72) Inventors: Rafael Wiemker, Kisdorf (DE); Tobias Klinder, Uelzen (DE); Thomas Buelow, Grosshansdorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 59 days.

(21) Appl. No.: 15/304,932

(22) PCT Filed: May 19, 2015

(86) PCT No.: PCT/IB2015/053678
§ 371 (c)(1),
(2) Date: Oct. 18, 2016

(87) PCT Pub. No.: WO2015/177723
PCT Pub. Date: Nov. 26, 2015

(65) Prior Publication Data
US 2017/0186215 A1  Jun. 29, 2017

Related U.S. Application Data

(60) Provisional application No. 62/000,057, filed on May 19, 2014.

(51) Int. Cl.
*G06T 15/08*  (2011.01)
*G06T 15/06*  (2011.01)
(Continued)

(52) U.S. Cl.
CPC ............ *G06T 15/06* (2013.01); *G06T 7/0012* (2013.01); *G06T 7/187* (2017.01); *G06T 15/08* (2013.01);
(Continued)

(58) Field of Classification Search
CPC ......... G06T 7/11; G06T 7/0012; G06T 7/136; G06T 15/08; G06T 2207/10072; G06T 2207/10081
(Continued)

(56) References Cited

U.S. PATENT DOCUMENTS 7,965,810 B2  6/2011  Roy
8,107,707 B2  1/2012  Wiemker
(Continued)

FOREIGN PATENT DOCUMENTS

JP  2005028121  2/2005
WO  2008/065611  6/2008

OTHER PUBLICATIONS

Wiemker, et al., "A Radial Structure Tensor and Its Use for Shape-Encoding Medical Visualization of Tubular and Nodular Structures", IEEE Transactions on Visualization and Computer Graphics, vol. 19, No. 3, Mar. 1, 2013.
(Continued)

*Primary Examiner* — Diane Wills

(57) ABSTRACT

A method includes obtaining contrast-enhanced image data having a plurality of voxels, each voxel having an intensity value. The method further includes determining a vesselness value for each voxel. The method further includes determining a hypo-density value for each voxel. The method further includes weighting each of the intensity values by a corresponding vesselness value. The method further includes weighting each of the hypo-density values by the corresponding vesselness value. The method further includes combining the weighted intensity values and the weighted hypo-density values, thereby generating composite image data. The method further includes visually displaying the composite image data.

20 Claims, 6 Drawing Sheets

(51) Int. Cl.
   *G06T 7/00*   (2017.01)
   *G06T 7/187*  (2017.01)
   *G06T 19/20*  (2011.01)

(52) U.S. Cl.
   CPC .... *G06T 19/20* (2013.01); *G06T 2207/10072* (2013.01); *G06T 2207/10081* (2013.01); *G06T 2207/30101* (2013.01); *G06T 2210/41* (2013.01); *G06T 2219/2008* (2013.01)

(58) Field of Classification Search
   USPC .................................................. 600/407–480
   See application file for complete search history.

(56) References Cited

U.S. PATENT DOCUMENTS

| | | |
|---|---|---|
| 2006/0050939 A1 | 3/2006 | Wiemker |
| 2006/0056691 A1 | 3/2006 | Vaz |
| 2009/0252394 A1 | 10/2009 | Liang |
| 2010/0074493 A1* | 3/2010 | Wiemker ............... A61B 6/032 382/130 |
| 2010/0177177 A1 | 7/2010 | Sonnemans |
| 2011/0200241 A1 | 8/2011 | Roy |

OTHER PUBLICATIONS

Pichon, et al., A novel method for pulmonary emboli visualization from high-resolution CT images, Proc. SPIE Medical Imaging 2004, SPIE vol. 5367.

Henri Bouma, et al., "Automatic Detection of Pulmonary Embolism in CTA Images", IEEE Transactions on Medical Imaging, vol. 28, No. 8, Aug. 2009.

Shikata, et al., "Segmentation of Pulmonary Vascular Trees from Thoracic 3D CT Images", Hindawi Publishing Corporation, International Journal of Biomedical Imaging, vol. 2009, Article ID 636240.

* cited by examiner

VISUALIZATION OF TISSUE OF INTEREST IN CONTRAST-ENHANCED IMAGE DATA

CROSS REFERENCE TO RELATED APPLICATIONS

This application is the U.S. National Phase application under 35 U.S.C. § 371 of International Application No. PCT/IB2015/053678, filed May 19, 2015, published as WO 2015/177723 on Nov. 26, 2015, which claims the benefit of U.S. Provisional Patent Application No. 62/000,057 filed May 19, 2014. These applications are hereby incorporated by reference herein.

The following generally relates to visualizing image data and in particular to visualizing of tissue of interest in contrast-enhanced image data, and is described with particular application to computed tomography (CT). The following is also amenable to magnetic resonance (MR), ultrasound (US) and/or other three dimensional (3D) imaging modalities with contrast enhanced imaging capabilities.

A computed tomography (CT) scanner includes an x-ray tube that emits radiation that traverses an examination region and a portion of a subject therein. A detector detects radiation traversing the examination region and generates projection data indicative of the detected radiation. A reconstructor reconstructs the projection data and generates volumetric image data indicative of the portion of the subject in the examination region. The volumetric image data can be processed to generate one or more images of the portion of the subject in the examination region.

With a contrast-enhanced scan, such images have been visually inspected to detect a pulmonary embolism, e.g., for patients with chest pain. The presence of a pulmonary embolism can be life-threatening, but detected pulmonary embolisms can be dissolved with pharmaceuticals. Pulmonary embolisms manifest as hypo-dense areas in normally contrast-agent filled pulmonary arteries. However, the visual search for pulmonary embolisms is a tedious task for which the image reader inspects all of the images. The hypo-density of the pulmonary embolism locations is relatively subtle in comparison to the contrast between vessels and surrounding lung parenchyma. As such, a pulmonary embolism may be overlooked.

Image data rendering techniques include maximum intensity projection (MIP), minimum intensity projection (mIP) and vessel enhancing projection of the HU densities. Unfortunately, these techniques are not well-suited for detecting pulmonary embolisms. For example, with MIP, pulmonary embolisms have a lower Hounsfield unit (HU) (or CT number) than the surrounding vascular space. An example is shown in FIGS. 1 and 2. FIG. 1 shows a 2D slice 102 with a volume of interest (VOI) bounding box 104. FIG. 2 shows a standard MIP 202 of the intensities in the box 104. As shown, vascular and non-vascular are overlaid, occluding each other.

With MIP, pulmonary embolisms may not manifest because they have a lower density than the normal vessels. With mIP, pulmonary embolisms may not manifest because—although they have a lower density than the normal vessels, they have a higher HU than the surrounding parenchymal or mediastinal tissue. With vessel enhancing projection of the HU densities, pulmonary embolisms may not manifest because the HU densities vary throughout the pulmonary vessel tree, depending on the contrast distribution, vessel diameter, etc., and hypo-density locations may be occluded by other surrounding vessels. Thus, these approaches also produce rendering that are not very useful in detecting pulmonary embolisms. In view of at least the above, there is an unresolved need for other approaches to visualizing image data, for example, for pulmonary embolism inspection and detection.

Aspects described herein address the above-referenced problems and others.

The following describes an image processing approach to generate a rendering that highlights suspected presence and locations of pulmonary embolisms in contrasted-enhanced volumetric image data. The enhancement, in one instance, is achieved by a combination of a vessel filter and a hypo-density filter. The results of the vessel and hypo-density filters can be visualized separately through renderings and/or a combined rendering. One or more of the renderings can be displayed in a graphical user interface (GUI) and facilitates efficient navigation from the pulmonary embolism enhancing renderings to a location of a pulmonary embolism in a corresponding 2D slice.

In one aspect, a method includes obtaining contrast-enhanced image data having a plurality of voxels, each voxel having an intensity value. The method further includes determining a vesselness value for each voxel. The method further includes determining a hypo-density value for each voxel. The method further includes weighting each of the intensity values by a corresponding vesselness value. The method further includes weighting each of the hypo-density values by the corresponding vesselness value. The method further includes combining the weighted intensity values and the weighted hypo-density values, thereby generating composite image data. The method further includes visually displaying the composite image data.

In another aspect, a computing system includes a processor and a memory. The memory includes an image data processor module with computer readable instructions. The processor, in response to executing the computer readable instructions of the image data processor module, obtains contrast-enhanced image data, which includes voxels having intensity values, determines a vesselness value for each voxel, determines a hypo-density value for each voxel, weight each of the intensity values by a corresponding vesselness value, weight each of the hypo-density values by the corresponding vesselness value, combine the weighted intensity values and the weighted hypo-density values, generate composite image data, and visually display the composite image.

In another aspect, a computer readable storage medium is encoded with computer readable instructions. The computer readable instructions, when executed by a processor, causes the processor to: determine a vesselness for each voxel in image data, determine a hypo-density for each of the voxels, weight the image data by the vesselness, generating vesselness weighted imaged data, weight the hypo-density by the vesselness, generating vesselness weighted hypo-densities, combine the vesselness weighted imaged data and the vesselness weighted hypo-densities, generating combined data, and visually display the combined data.

The invention may take form in various components and arrangements of components, and in various steps and arrangements of steps. The drawings are only for purposes of illustrating the preferred embodiments and are not to be construed as limiting the invention.

Figure 2:
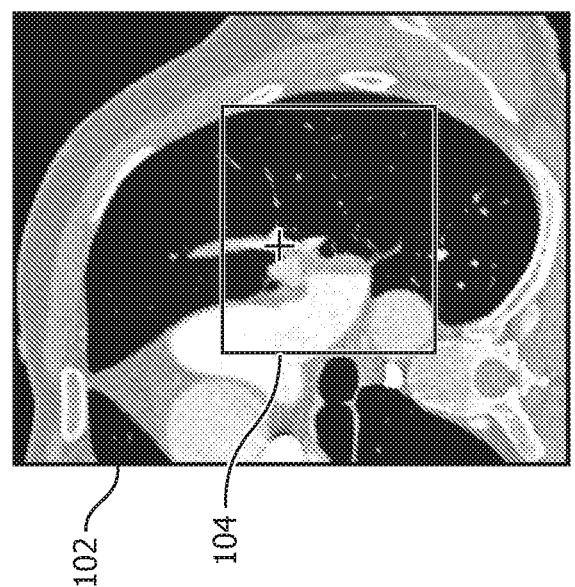
FIG. 2 shows a prior art MIP rendering corresponding to the image data in the volume of interest bounding box of FIG. 1.
Figure 1:
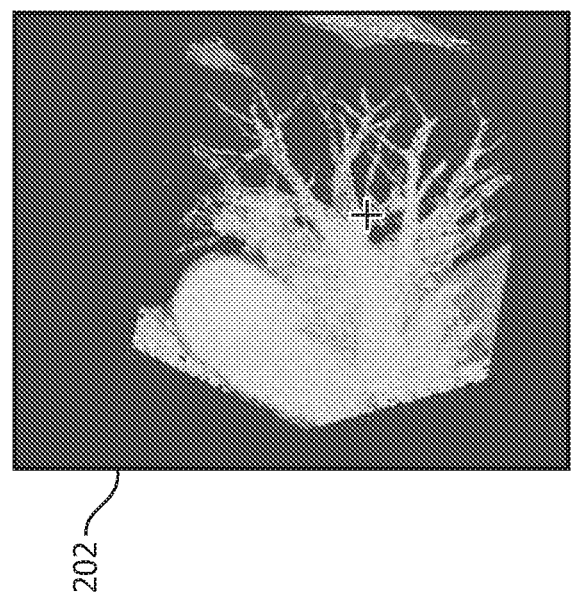
FIG. 1 shows an axial slice from a contrast-enhanced scan and a volume of interest bounding box.
Figure 3:
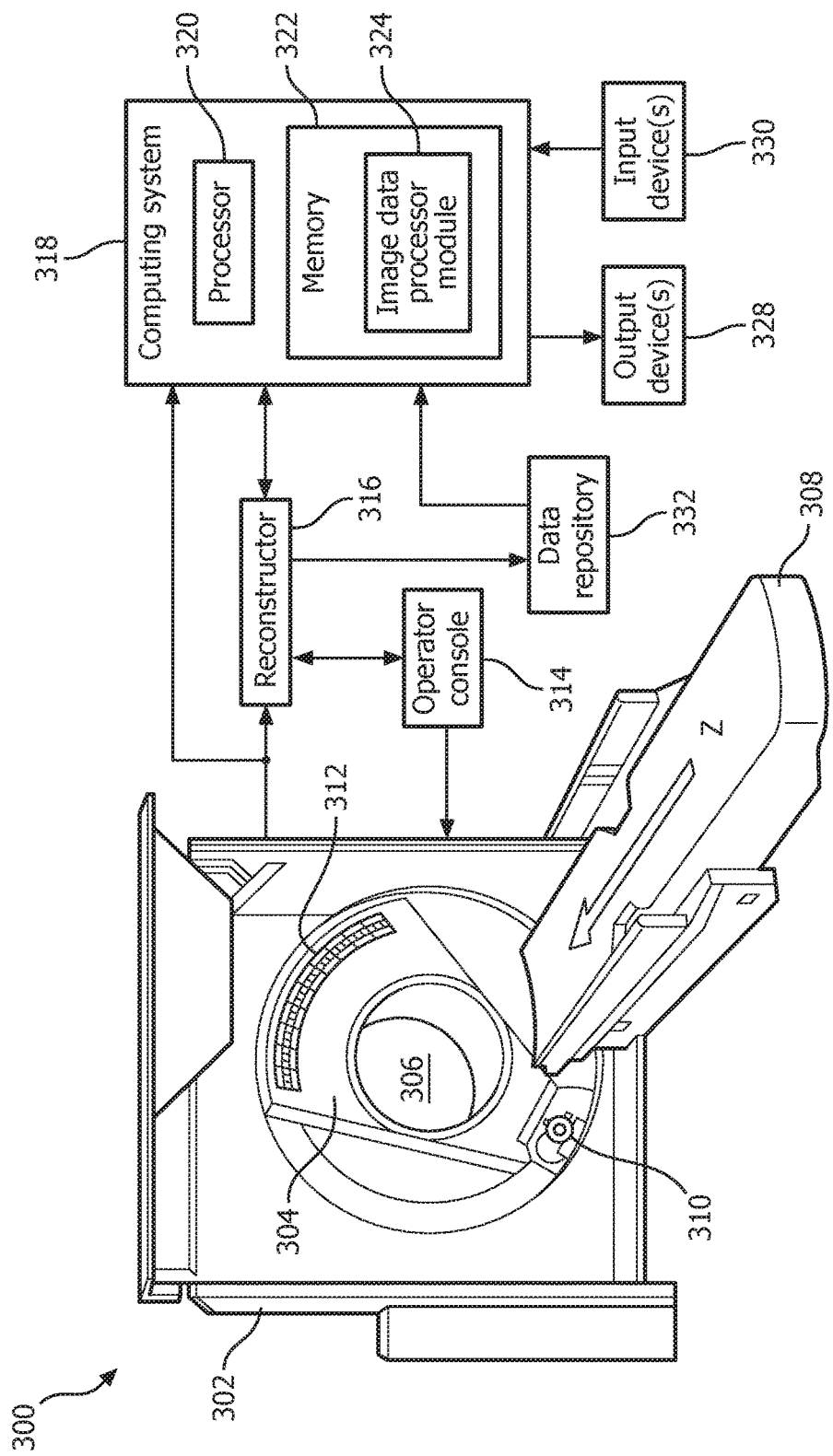

FIG. 3 schematically illustrates an example computing system with an image data processing module in connection with an imaging system.

Figure 4:
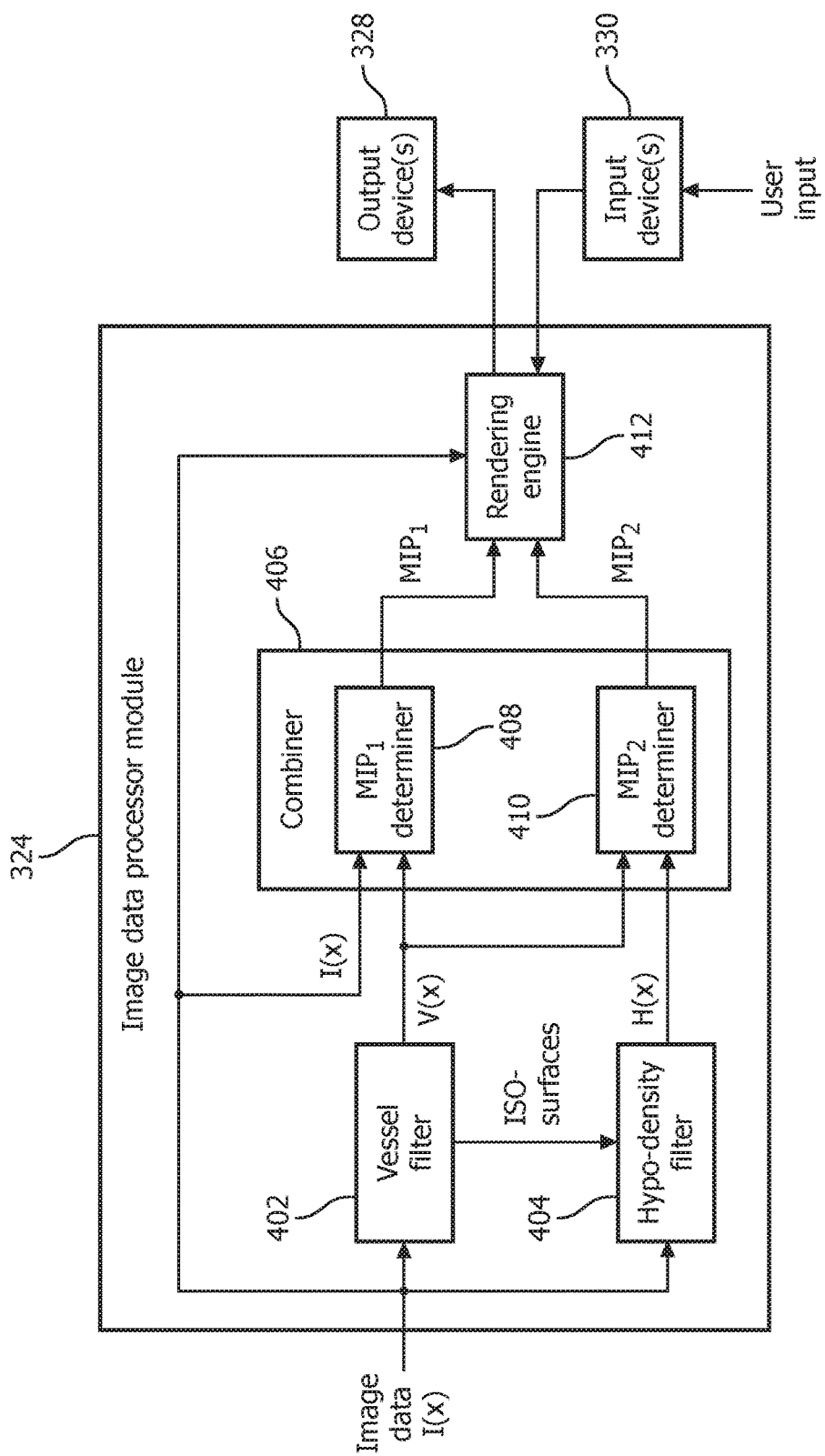

FIG. 4 schematically illustrates an example of the image data processing, which includes a vessel filter and a hypo-density filter.

Figure 5:
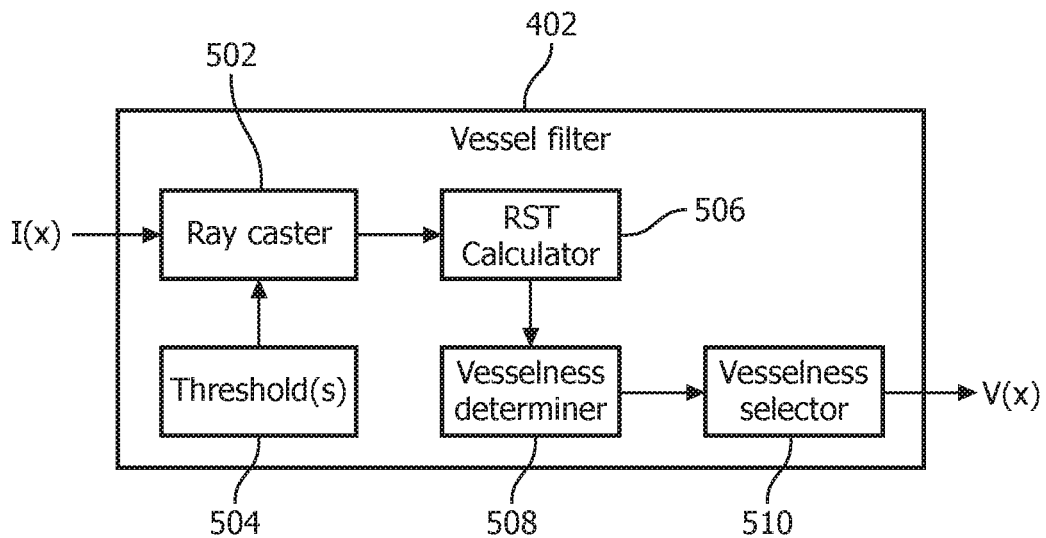

FIG. 5 schematically illustrates an example of the vessel filter.

Figure 6:
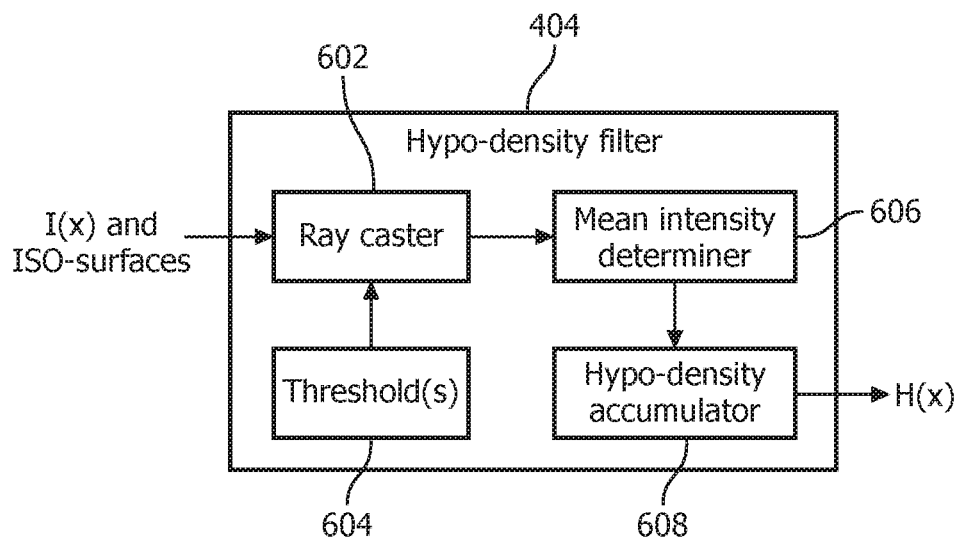

FIG. 6 schematically illustrates an example of the hypo-density filter.

Figure 7:
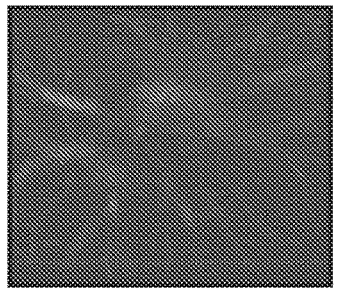

FIG. 7 illustrates a vesselness weighted intensity image.

Figure 8:
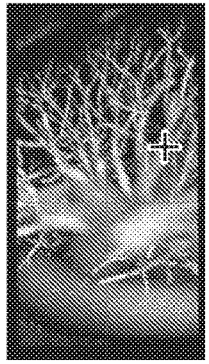

FIG. 8 illustrates a vesselness weighted hypo-density image.

Figure 9:
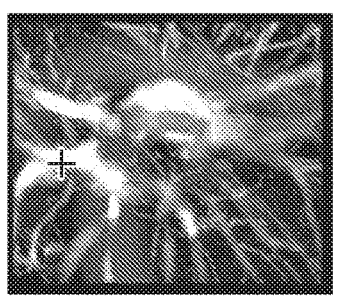

FIG. 9 illustrates a composite image generated by combining the images of FIGS. 7 and 8.

Figure 10:
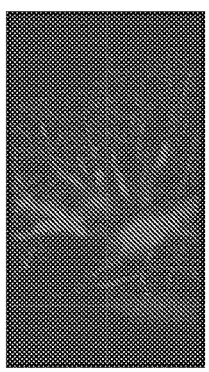

FIG. 10 illustrates a 2D slice corresponding to a selected location in the composite image of FIG. 9.

Figure 11:
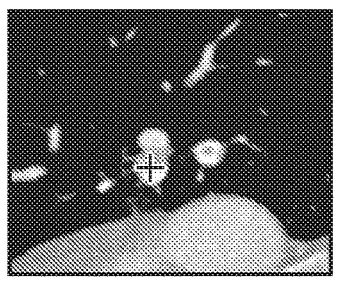

FIG. 11 illustrates another vesselness weighted intensity image.

Figure 12:

FIG. 12 illustrates another vesselness weighted hypo-density image.

Figure 13:
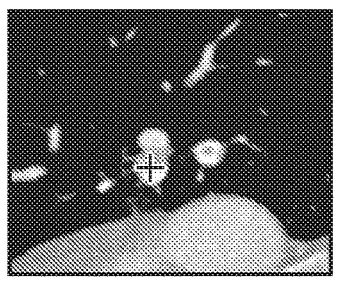

FIG. 13 illustrates a composite image generated by combining the images of FIGS. 11 and 12.

Figure 14:
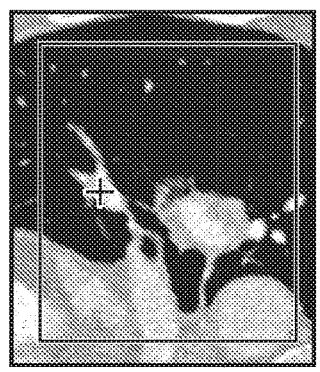

FIG. 14 illustrates a 2D slice corresponding to a selected location in the composite image of FIG. 13.

Figure 15:
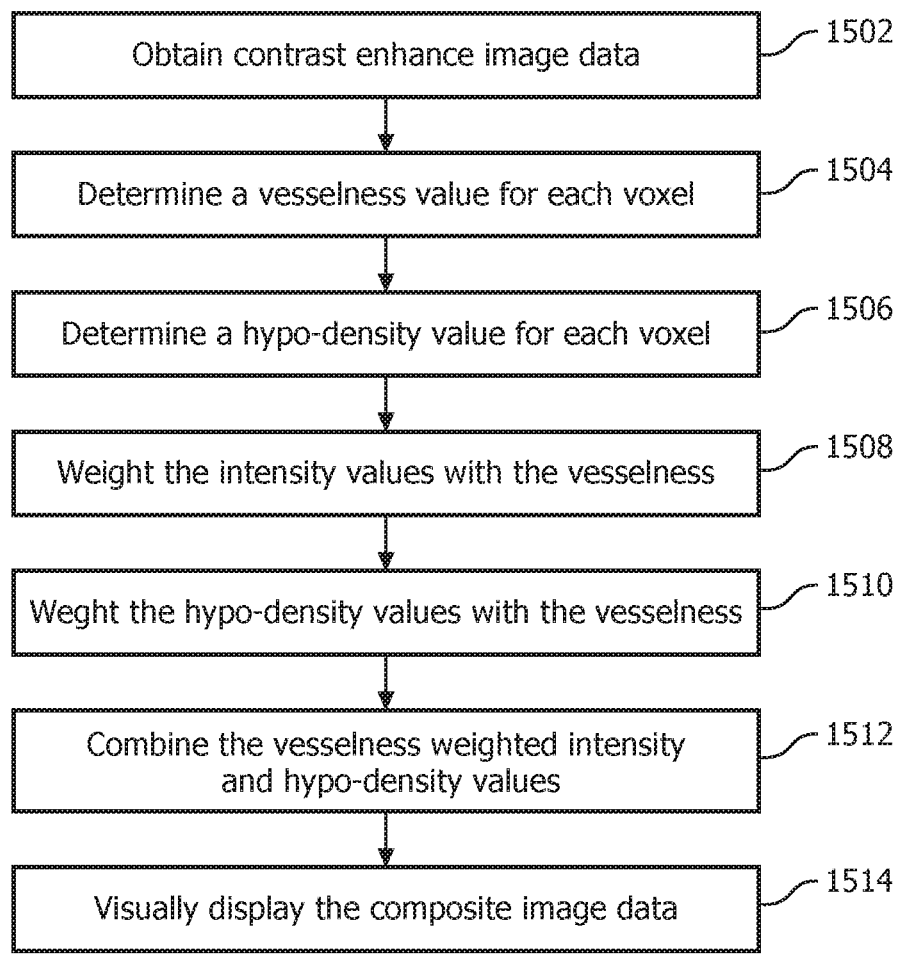

FIG. 15 illustrates a method for visualizing tissue of interest.

Initially referring to FIG. 3, an example imaging system 300, such as a computed tomography (CT) scanner, is schematically illustrated. The imaging system 300 includes a generally stationary gantry 302 and a rotating gantry 304. The rotating gantry 304 is rotatably supported by the stationary gantry 302 and rotates around an examination region 306 about a longitudinal or z-axis. A subject support 308, such as a couch, supports a subject in the examination region 306, e.g., before, during and/or after scanning.

A radiation source 310, such as an x-ray tube, is rotatably supported by the rotating gantry 304. The radiation source 310 rotates with the rotating gantry 304 and emits radiation that traverses the examination region 306. A one or two-dimensional radiation sensitive detector array 312 subtends an angular arc opposite the radiation source 310 across the examination region 306. The detector array 312 includes a plurality of rows of detectors that extend along the z-axis direction. The detector array 312 detects radiation traversing the examination region 306 and generates projection data indicative thereof.

A computing system serves as an operator console 314 and includes a human readable output device such as a monitor and an input device such as a keyboard, mouse, etc. The console 314 allows an operator to interact with the scanner 300 via a graphical user interface (GUI) and/or otherwise. For instance, the user can employ the input device of the operator console 314 to select a contrast-enhanced and/or other imaging protocol. A reconstructor 316 reconstructs the projection data and generates volumetric data indicative thereof.

A computing system 318 includes a processor 320 (e.g., a central processing unit (cpu), a microprocessor (μcpu), a graphical processing unit (GPU), or the like) and a computer readable storage medium ("memory") 322. The memory 322 excludes transitory medium and includes physical memory and/or other non-transitory storage medium. The memory 322 includes an image data processor module 324, which includes image processing instructions. The processor 320 executes the computer instructions of the image data processor module 324. The computing system 318 can be part of the operator console 314 and/or separate therefrom (as shown in FIG. 3).

The image data processor module 324 includes image processing instructions, which, when executed by the processor 320, cause the processor to generate one or more renderings that highlight suspected presence and locations of tissue of interest, such as a pulmonary embolism, in contrasted-enhanced volumetric image data. As described in greater detail below, this includes applying filters to the volumetric image data and displaying the resulting renderings independently and/or as a combined rendering. The renderings visually emphasize the tissue or interest, and, with respect to pulmonary embolisms, mitigate the above shortcomings of MIP, mIP, and vessel enhancing.

The computing system 318 further includes an output device(s) 328 such as a display monitor, a filmer, etc., and an input device(s) 330 such as a mouse, keyboard, etc. The output device(s) 328 can be used to visually display image data such as reconstructed image data, slices generated thereon, and/or one or more of the renderings. The input device(s) 330 can be used to select one or more of the reconstructed image data, slices generated thereon, and/or one or more of the renderings to display in the a display monitor of the output device(s) 328, select a region of a displayed one or more of the renderings to navigate to the corresponding slice in volumetric image data, etc.

One or more of the renderings can be displayed in a graphical user interface (GUI) of the operator console 314. Such a display may facilitate efficient navigation from the pulmonary embolism enhancing renderings to the corresponding locations of interest in a standard 2D slice of the volumetric image data for standard visual assessment. The one or more renderings can be stored in a data repository 332 such as a picture archiving and communication systems (PACS), radiology information system (RIS), a hospital information system (HIS), an electronic medical record (EMR), a server, a database, and/or other data repository.

FIG. 4 schematically illustrates an example of the image data processor module 324.

The image data processor module 324 receives, as input, volumetric image data I(x), which, for example, includes intensities in units of Hounsfield Units (HUs). The volumetric image data I(x) can be obtained from the imaging system 300, another imaging system, the data repository 332, and/or another data repository.

The image data processor module 324 includes a vessel filter 402. The vessel filter 402 processes each voxel of the volumetric image data I(x) independently. The vessel filter 402 produces, for each voxel, 3D iso-surfaces and a scalar vesselness feature vector V(x) based on the volumetric image data I(x).

Briefly turning to FIG. 5 an example of the vessel filter 402 is schematically illustrated The example of the vessel filter 402 includes a vessel filter (VF) ray caster 502, an intensity threshold(s) 504, a radial structure tensor (RST) calculator 506, a vesselness determiner 508, and a vesselness selector 510. The intensity thresholds 504, in one instance, include a set of predetermined intensity thresholds. In another instance, the intensity thresholds 504 include a base intensity threshold and either an increment value or a decrement value.

The VF ray caster 502 casts, for a voxel of I(x), isotropic rays out, from a central region of the voxel, in three dimensions through neighboring voxels. The VF ray caster 502 compares, as a ray is being cast from a voxel, an intensity of the ray at each voxel it traverses with a threshold T of the threshold(s) 504. The VF ray caster 502, in response to the intensity of the ray traversing a voxel falling below a first threshold T of the threshold(s) 504, stops the ray at the voxel. Otherwise, the VF ray caster 502 continues to cast the ray into the next neighboring voxel.

The VF ray caster 502 performs the above for all or a sub-set of the rays cast from a voxel, for all or a sub-set of voxels of the volumetric image data I(x), for all or a sub-set of the threshold(s) 504. This may include starting with a largest of the threshold(s) 504 and using the next lowest (or decrementing the) threshold in a next iteration. It is to be understood that this ordering is not limiting, and any order can be utilized, including processing with all or a sub-set of the threshold(s) 504 in parallel. The rays, for each T, form an iso-surface S(T).

The RST calculator 506 calculates, for each of the iso-surfaces S(T), a radial structure tensor (RST). An example of calculating an RST is described (for a single iso-surface threshold) in Rafael Wiemker et al., "A Radial Structure Tensor and Its Use for Shape-Encoding Medical Visualization of Tubular and Nodular Structures," IEEE Transactions on Visualization and Computer Graphics," VOL. 19, 2013.

The vesselness determiner 508, in one instance, determines a vesselness as shown in EQUATION 1:

$$v_T(x) = e_1 \cdot c, \qquad \text{EQUATION 1}$$

where $e_1$ is the second strongest eigenvalue of the RST (i.e. the second largest by absolute magnitude), and c is a centricity. The centricity can be computed as shown in EQUATION 2:

$$c = \text{MAX}\{0, 1 - \sigma_r/\mu_r\}, \qquad \text{EQUATION 2}$$

where $\mu_r$ is a mean ray radius and $\sigma_r$ is a standard deviation of the ray radii.

The example of the vessel filter 402 further includes a vesselness selector 510. The vesselness selector 510, for each voxel and for all or a sub-set of the iso-surfaces S(T), identifies the vesselness $v_T$ with the maximum value and selects the maximum value as the vesselness V(x) for the voxel at location x. The vessel filter 402 outputs the vector (or filter response volume) of vesselnesses V(x) for all locations x.

Returning to FIG. 4, the image data processor module 324 includes a hypo-density filter 404. The hypo-density filter 404 processes each voxel of the volumetric image data I(x), independently, in connection with an iso-surface corresponding thereto. The hypo-density filter 404 produces, for each voxel, a scalar hypo-density feature vector H(x) based on the volumetric image data I(x) and the iso-surfaces S(T) that yielded the maximum value of $v_T$.

Briefly turning to FIG. 6 an example of the hypo-density filter 404 is schematically illustrated.

The example of the hypo-density filter 404 includes a ray caster 602, an intensity threshold(s) 604, a mean intensity determiner 606, and a hypo-density accumulator 608. The intensity threshold(s) 604, in the illustrated embodiment, include the intensity threshold(s) 504. In a variation, the intensity threshold(s) 604 includes at least one different threshold.

The hypo-density filer (HDF) ray caster 602 casts, within the iso-surface that yielded the maximum value of $v_T$, isotropic rays out in three dimensions. Similar to the VF ray caster 502, the HDF ray caster 602 stops a ray when an intensity of the ray drops below a threshold T of the threshold(s) 604. The HDF ray caster 602 repeats this for all or a sub-set of the iso-surfaces S(T) yielding the maximum value of $v_T$.

The mean intensity determiner 606, as the HDF ray caster 602 cast rays for all of the thresholds T of the threshold(s) 604, computes a running mean $\mu_I$. The hypo-density accumulator 608 accumulates, for each new intensity sample I(x'), a hypodensity H(x). In one instance, the hypo-density accumulator 608 accumulates a hypodensity H(x) as shown in EQUATION 3:

$$H(x) \mathrel{+}= \sup\{0, I(x') - \mu_I\}. \qquad \text{EQUATION 3}$$

Returning to FIG. 4, the image data processor module 324 further includes a combiner 406. The data combiner 406 receives, as an input, I(x), V(x), and H(x). The data combiner 406 includes a first $MIP_1$ determiner 408 and a second $MIP_2$ determiner 410. The first $MIP_1$ determiner 408 determines a first $MIP_1$ as shown in EQUATION 4:

$$MIP_1 = V(x) \cdot I(x), \qquad \text{EQUATION 4}$$

where $MIP_1$ represents standard local intensities weighted by the local vesselness. The second $MIP_1$ determiner 410 determines a second $MIP_2$ as shown in EQUATION 5:

$$MIP_2 = V(x) \cdot H(x), \qquad \text{EQUATION 5}$$

where $MIP_2$ represents the local hypo-densities weighted by the local vesselness.

The image data processor module 324 further includes a rendering engine 412. The rendering engine 412 receives, as an input, at least $MIP_1$, and $MIP_2$. The rendering engine 412 renders two independent MIPs ($MIP_1$, and $MIP_2$) via the output device(s) 328. The rendering engine 412 also combines the two MIPs, for example, linearly or non-linearly, and generates a composite rendering. The combination shows spatial orientation within the vasculature with color coding of locations of hypo-densities. In a variation, the rendering engine 412 also receives and renders at least one of V(x) or H(x).

The rendering engine 412, in response to receiving a signal indicative of a user selected region of a rendered rendering (i.e., the $MIP_1$, $MIP_2$, or combination) from the input device(s) 330, determines the 3D location which contributed the highest intensity to this rendering view ray. The signal may be invoked by the user selecting the region in the rendering determines via mouse, touchscreen, and/or otherwise. The rendering engine 412 then superimposes graphical indicia (e.g., a cross hair or other indicia) over the volume rendering, visually identifying the selected region. The rendering engine 412 further renders the 2D slice corresponding to the determined 3D location. The rendering engine 412 superimposes graphical indicia (e.g., a cross hair or other indicia) over the 2D slice.

A user can observe and/or manipulate any of the renderings. For pulmonary embolism analysis, this may include deciding whether a pulmonary embolism is present. The vessel filter 402 can be utilized (e.g., with inverted sign) to enhance airways instead of vessels. The enhanced airways can be superimposed over (e.g., with a different color) an MIP rendering. This allows an implicit orientation for the user since the arteries are known to run in parallel to the airways (unlike the veins).

FIGS. 7 and 8 show examples of $MIP_1$s, and FIGS. 9 and 10 show examples of $MIP_2$s. FIGS. 11 and 12 show examples of composite renderings, with FIG. 11 being a composite of FIGS. 7 and 9, and FIG. 12 being a composite of FIGS. 10 and 11.

In the illustrated embodiment, in the composited renderings (FIGS. 11 and 12) both the vesselness weighted intensity values (FIGS. 7 and 8) and the vesselness weighted hypo-density values (FIGS. 9 and 10) are in gray scale. In a variation, at least one of the vesselness weighted intensity values or the vesselness weighted hypo-density values are rendered in color, which may further visually differentiate between the hypo-densities and the vessels.

FIGS. 13 and 14 show 2D images corresponding to selected locations in the composite images of FIGS. 11 and 12.

FIG. 15 illustrates a method for generating and displaying a volumetric rendering based on the image data.

It is to be appreciated that the ordering of the below acts is for explanatory purposes and not limiting. As such, other orderings are also contemplated herein. In addition, one or more of the acts may be omitted and/or one or more other acts may be included.

At 1502, contrast-enhanced image data is obtained. The voxels of the image data are intensity values.

At 1504, a vesselness value for each voxel of the obtained contrast-enhanced image data is determined.

At 1506, a hypo-density value for each voxel of the obtained contrast-enhanced image data is determined.

At 1508, the intensity values are weighted with the vesselness value, generating vesselness weighted intensity values.

At 1510, the hypo-density values are weighted with the vesselness value, generating vesselness weighted hypo-density values.

At 1512, the vesselness weighted intensity values and the vesselness weighted hypo-density values are combined, generating composite image data.

At 1514, the composite image data is visually displayed.

The above methods may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A method, comprising:
obtaining contrast-enhanced image data having a plurality of voxels, each voxel having an intensity value;
determining a vesselness value for each voxel;
determining a hypo-density value for each voxel;
weighting each of the intensity values by a corresponding vesselness value;
weighting each of the hypo-density values by the corresponding vesselness value;
combining the weighted intensity values and the weighted hypo-density values, thereby generating composite image data; and
visually displaying the composite image data.

2. The method of claim 1, further comprising:
weighting each of the intensity values by multiplying each of the intensity values by the corresponding vesselness value.

3. The method of claim 1, further comprising:
weighting each of the hypo-density values by multiplying each of the hypo-density values by the corresponding vesselness value.

4. The method of claim 1, further comprising:
generating the composite image by superimposing the weighted hypo-density values over the weighted intensity values.

5. The method of claim 4, further comprising:
rendering the weighted intensity values using a gray scale; and
rendering the weighted hypo-density values using color.

6. The method of claim 1, determining a vesselness value for a voxel, comprising:
casting rays from a central region of the voxel out in three-dimensions into neighboring voxels;
comparing an intensity value of each ray as each ray traverses a neighboring voxel with a first predetermined intensity threshold;
stopping the casting of a ray only in response to the intensity value of the ray being below the first predetermined intensity threshold, wherein the rays in aggregate form a first iso-surface; and
repeating the casting, the comparing and the stopping for at least one subsequent predetermined intensity threshold, forming at least one subsequent iso-surface.

7. The method of claim 6, determining the vesselness value for the voxel, further comprising:
determining a first radial structure tensor based on the first iso-surface;
determining a first vesselness based on the first radial structure tensor;
determining a subsequent radial structure tensor based on the at least one subsequent iso-surface; and
determining a subsequent vesselness based on the subsequent radial structure tensor.

8. The method of claim 7, wherein the first vesselness is determined by multiplying a second strongest eigenvalue of the first radial structure tensor with a first centricity, which is based on a mean ray radius and a standard deviation of the ray radii, and wherein the at least one subsequent vesselness is determined by multiplying a second strongest eigenvalue of the subsequent radial structure tensor with a second centricity.

9. The method of claim 8, the determining the vesselness value for the voxel, further comprising:
selecting a vesselness from the first vesselness and the at least one subsequent vesselness having a maximum value as the vesselness for the voxel.

10. The method of claim 9, the determining a hypo-density value for the voxel, further comprising:
casting rays, from the iso-surface corresponding to the selected vesselness, out in three-dimensions into neighboring voxels;
comparing an intensity value of each ray as each ray traverses a neighboring voxel with the first predetermined intensity threshold;
stopping the casting of a ray in response to the intensity value of the ray being below the first predetermined intensity threshold,
computing a running mean from the intensity value; and
calculating a hypo-density based on the voxel intensity and the running mean.

11. The method of claim 10, the determining the hypo-density value for the voxel, further comprising:
calculating the hypo-density by subtracting the running mean from the voxel intensity.

12. The method of claim 10, the determining the hypo-density value for the voxel, further comprising:
casting rays, from the iso-surface corresponding to the selected vesselness, out in three-dimensions into neighboring voxels;

comparing an intensity value of each ray as each ray traverses the neighboring voxel with the at least one subsequent predetermined intensity threshold;
stopping the casting of a ray in response to the intensity value of the ray being below the at least one subsequent predetermined intensity threshold;
updating the running mean from the intensity value; and
calculating the hypo-density based on the voxel intensity and the updated running mean.

13. The method of claim 1, further comprising:
receiving an input indicative of a region in the displayed composite image data;
identifying a 2D image from the image data corresponding to the region; and
displaying the 2D image.

14. A computing system, comprising:
a processor; and
a memory, including an image data processor module with computer readable instructions, wherein the processor, in response to executing the computer readable instructions of the image data processor module:
obtains contrast-enhanced image data having a plurality of voxels, each voxel having an intensity value;
determines a vesselness value for each voxel;
determines a hypo-density value for each voxel;
weights each of the intensity values by a corresponding vesselness value;
weights each of the hypo-density values by the corresponding vesselness value;
combines the weighted intensity values and the weighted hypo-density values; generate composite image data; and
visually displays the composite image.

15. The computing system of claim 14, wherein the processor, in response to executing the computer readable instructions of the image data processor module, further:
casts rays from a central region of a voxel out in three-dimensions into neighboring voxels;
compares an intensity value of each ray as each ray traverses a neighboring voxel with a first predetermined intensity threshold;
stops the casting of a ray in response to the intensity value of the ray being below the first predetermined intensity threshold, wherein the rays in aggregate form a first iso-surface; and
repeats the casting, the comparing and the stopping for at least one subsequent predetermined intensity threshold, forming at least one subsequent iso-surface.

16. The computing system of claim 14, wherein the processor, in response to executing the computer readable instructions of the image data processor module, further:
casts rays from a central region of a voxel out in three-dimensions into neighboring voxels;
compares an intensity value of each ray as each ray traverses a neighboring voxel with a first predetermined intensity threshold;
stops the casting of a ray in response to the intensity value of the ray being below the first predetermined intensity threshold, wherein the rays in aggregate form a first iso-surface;
repeats the casting, the comparing and the stopping for at least one subsequent predetermined intensity threshold, forming at least one subsequent iso-surface;
determines a first radial structure tensor based on the first iso-surface;
determines a first vesselness based on the first radial structure tensor;
determines a subsequent radial structure tensor based on the at least one subsequent iso-surface;
determines a subsequent vesselness based on the subsequent radial structure tensor; and
selects a vesselness from the first vesselness and the at least one subsequent vesselness having a maximum value as the vesselness for the voxel.

17. The computing system of claim 16, wherein the processor, in response to executing the computer readable instructions of the image data processor module, further:
casts rays, from the iso-surface corresponding to the selected vesselness, out in three-dimensions into neighboring voxels;
compares an intensity value of each ray as each ray traverses a neighboring voxel with the first predetermined intensity threshold;
stops the casting of a ray in response to the intensity value of the ray being below the first predetermined intensity threshold;
computes a running mean from the intensity value; and
calculates a hypo-density based on the voxel intensity and the running mean.

18. The computing system of claim 17, wherein the processor, in response to executing the computer readable instructions of the image data processor module, further:
casts rays, from the iso-surface corresponding to the selected vesselness, out in three-dimensions into neighboring voxels;
compares an intensity value of each ray as each ray traverses the neighboring voxel with the at least one subsequent predetermined intensity threshold;
stops the casting of a ray in response to the intensity value of the ray being below the at least one subsequent predetermined intensity threshold;
updates the running mean from the intensity value; and
calculates the hypo-density based on the voxel intensity and the updated running mean.

19. The computing system of claim 18, wherein the processor, in response to executing the computer readable instructions of the image data processor module, further:
receives an input indicative of a region in the displayed composite image data;
identifies a 2D image from the image data corresponding to the region; and
displays the 2D image.

20. A computer readable storage medium encoded with one or more computer executable instructions, which, when executed by a processor of a computing system, causes the processor to:
determine a vesselness for each voxel in computed tomography image data;
determine a hypo-density for each of the voxels;
weight the image data by the vesselness, generating vesselness weighted image data;
weight the hypo-density by the vesselness, generating vesselness weighted hypo-densities;
combines the vesselness weighted image data and the vesselness weighted hypo-densities, generating combined data; and
visually display the combined data.

* * * * *